(12) United States Patent
Novakovic et al.

(10) Patent No.: US 10,317,872 B2
(45) Date of Patent: *Jun. 11, 2019

(54) METHOD OF SELF-ADJUSTING A MACHINE TO COMPENSATE FOR PART-TO-PART VARIATIONS

(71) Applicant: SPM Automation (Canada) Inc., Windsor (CA)

(72) Inventors: Boris Novakovic, Lakeshore (CA); Christian Peter Holtkamp, Windsor (CA)

( * ) Notice: Subject to any disclaimer, the term of this patent is extended or adjusted under 35 U.S.C. 154(b) by 527 days.

This patent is subject to a terminal disclaimer.

(21) Appl. No.: 15/013,338

(22) Filed: Feb. 2, 2016

(65) Prior Publication Data

US 2017/0038756 A1    Feb. 9, 2017

Related U.S. Application Data

(60) Provisional application No. 62/202,231, filed on Aug. 7, 2015.

(51) Int. Cl.
| | |
|---|---|
| G05B 19/19 | (2006.01) |
| G05B 19/27 | (2006.01) |
| G05B 19/406 | (2006.01) |
| B25J 9/16 | (2006.01) |

(52) U.S. Cl.
CPC ............ *G05B 19/27* (2013.01); *B25J 9/1697* (2013.01); *G05B 19/19* (2013.01); *G05B 19/406* (2013.01); *G05B 2219/39388* (2013.01); *G05B 2219/43118* (2013.01); *G05B 2219/49007* (2013.01); *Y10S 901/02* (2013.01); *Y10S 901/16* (2013.01); *Y10S 901/41* (2013.01); *Y10S 901/47* (2013.01)

(58) Field of Classification Search
CPC ........ B25J 9/1697; G05B 19/19; G05B 19/27; G05B 19/406; G05B 2219/39388; G05B 2219/43118; G05B 2219/49007; Y10S 901/02; Y10S 901/16; Y10S 901/41; Y10S 901/47

See application file for complete search history.

(56) References Cited

U.S. PATENT DOCUMENTS

| | | | | |
|---|---|---|---|---|
| 4,581,566 | A * | 4/1986 | Ekstrom | ................ B25J 9/1692 318/568.14 |
| 5,525,808 | A * | 6/1996 | Irie | ....................... G03F 9/7003 250/548 |
| 9,535,243 | B2 * | 1/2017 | Olson | ................... G02B 21/002 |
| 2002/0166848 | A1 | 11/2002 | Furujo | |
| 2005/0005465 | A1 * | 1/2005 | Taylor | ................... G01B 11/005 33/502 |
| 2008/0160873 | A1 * | 7/2008 | Yoneda | ................... A63H 11/18 446/86 |
| 2009/0264545 | A1 * | 10/2009 | Sequeira | ............. B29B 17/0042 521/48 |
| 2014/0150510 | A1 | 6/2014 | Beltran | |
| 2017/0234993 | A1 * | 8/2017 | Fujiwara | ................... G01T 1/20 264/21 |

* cited by examiner

*Primary Examiner* — Kenneth M Lo
*Assistant Examiner* — Mohammad A Rahman
(74) *Attorney, Agent, or Firm* — George L. Boller

(57) ABSTRACT

A machine which repetitively performs an operation, or operations, on mass-produced parts which are subject to part-to-part variations compensates for such variations by self-adjustment of its operation, or operations, at a location, or locations, where an operation, or operations, is, or are, performed.

17 Claims, 15 Drawing Sheets

1. HDPE-25%
2. REGRIND-40%
3. ADHESIVE-2%
4. EVOH-3%
5. ADHESIVE-2%
6. HDPE-25%

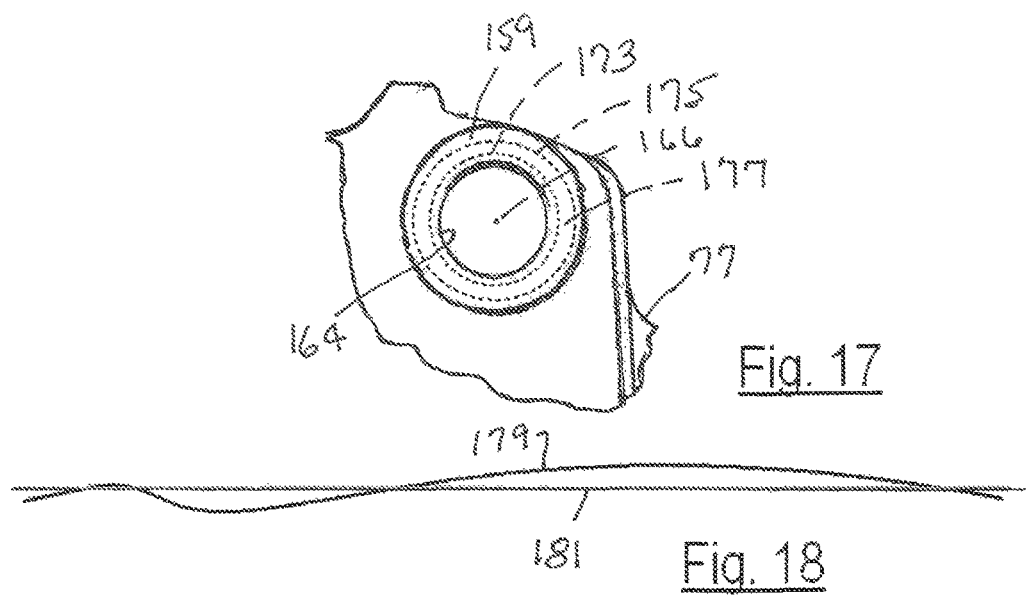
Fig. 17
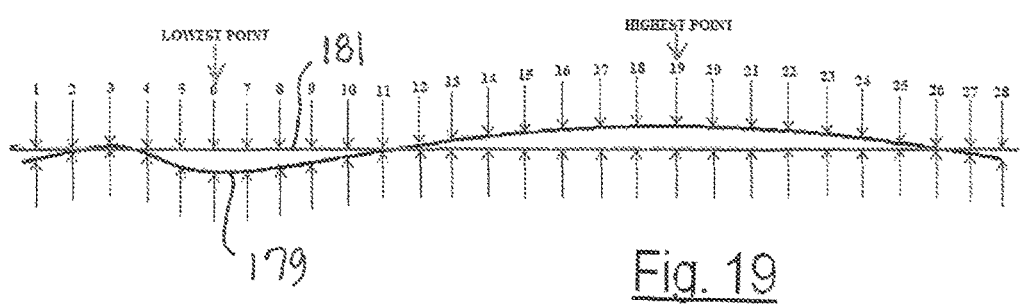
Fig. 18
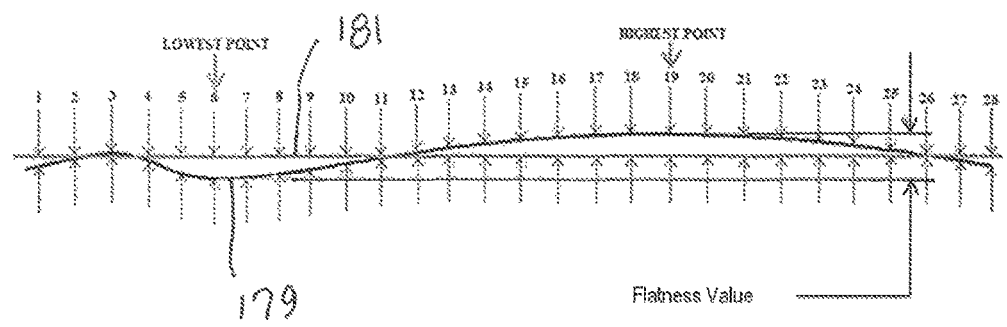
Fig. 19
Fig. 20

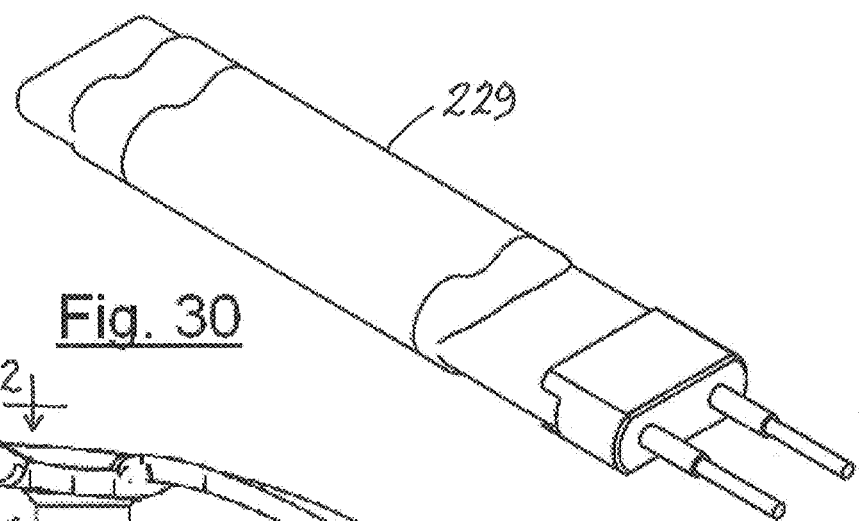
Fig. 30
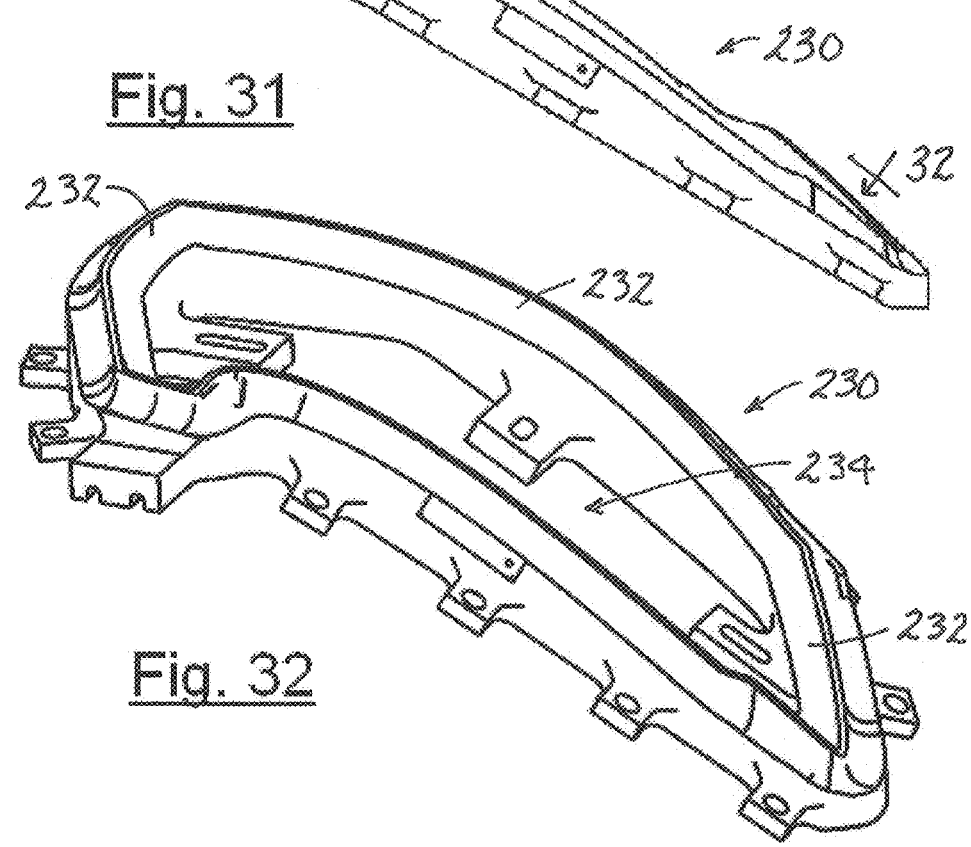
Fig. 31
Fig. 32

METHOD OF SELF-ADJUSTING A MACHINE TO COMPENSATE FOR PART-TO-PART VARIATIONS

TECHNICAL FIELD AND PRIORITY CLAIM

This disclosure relates to methods for self-adjusting industrial machinery which performs automated operations on mass-produced parts, and claims priority benefit of App. No. 62/202,231, filed Aug. 7, 2015.

BACKGROUND

A mass-produced part is commonly manufactured to a specification which defines a master model of the part using specific values of various physical characteristics such as geometric dimensions, characteristics of the part material, etc. A part specification also recognizes that physical characteristics of actual production parts may differ from those of the master model defined in the specification. Some part-to-part differences may be acceptable in a particular mass-production manufacturing process, but others are not. Consequently a specification for a part which is mass-produced in a particular manufacturing process may contain allowable tolerances for various physical characteristics of the part.

A plastic part is first manufactured by a molding process, such as blow molding, and is then further processed by various operations which for example, may include boring, drilling, and welding. Part-to-part variations in molded plastic parts may apply to almost any particular physical characteristic, but may be generally said to involve geometric differences, such as wall thickness and flatness for example, which can be caused by variations of melt flow rate, humidity of raw material, ambient temperature, etc. Those factors can cause significant part-to-part variation in finished parts when compared to the master model.

A common way of defining a particular dimension of a mass-produced part is by specifying an acceptable range for the particular dimension, such as a length of 100.0 mm.+/−1.5 mm., which defines an acceptable range in length from, and including, 98.5 mm. to, and including, 101.5 mm. Stated another way, the dimension has a nominal length of 100.0 mm. and a tolerance on that length of +/−1.5 mm. Any length within that range is said to be within tolerance. Any length not within that range is said to be out-of-tolerance.

The nature of a particular material or materials of a mass-produced part and the nature of the industrial machinery which performs operations on those parts may have significant effect on dimensional tolerances for the part. For example, mass-produced machined steel parts can be fabricated with a greater degree of precision than can mass-produced parts which are fabricated by certain molding processes and whose material is less rigid than steel, such as blow molding of plastic parts. Consequently when further processing operations, such as drilling and boring for example, are performed on those two types of parts, modern machine tools can perform those operations on steel parts with precision which allows a specification for such a part to have very small tolerances while comparable operations on mass-produced molded parts whose material is less rigid than steel do not allow a specification for such a part to have the small tolerances which apply to the steel part.

When the process for manufacturing a mass-produced part involves using a machine to perform one or more of operations on a part, the part is placed in a particular three dimensional relationship to the machine. Because of part-to-part dimensional differences, the location where a particular operation is performed on one part may differ from the location where the same operation is performed on another part. As long as each of those two parts is within tolerance before the operation is performed, and the path of motion of an element of a machine which performs the operation is invariant from part-to-part, dimensionally correct parts will be manufactured.

A machine which comprises an industrial robot can position an element which performs an operation on a part during a manufacturing process with a high degree of accuracy and repeatability. Consequently, it is essentially part-to-part variation, and not the machine, which is the predominant cause of a finished manufactured part being out-of-tolerance.

Certain parts which are fabricated by a molding process such as blow molding may be subject to localized variations in thickness, to variations in locations of certain features such as holes, and to variations in shapes of certain features. For example, a zone which should ideally be flat may be bumpy or it may be tipped out of an imaginary plane which it should occupy.

When a machine having an industrial robot for positioning a heated welding plate which is to perform a welding operation at a particular location on a molded part which is subject to significant part-to-part variation, the inability of the machine to self-adjust itself to compensate for part-to-part variation at the location on the part where the operation is to be performed, the thickness of the part at that location, and the shape of the part at that location, may produce an unacceptable number of out-of-tolerance parts.

SUMMARY OF THE DISCLOSURE

This disclosure introduces a machine which self-adjusts its operations to compensate for part-to-part variations at a location on a part where an operation, or operations, is, or are, to be performed. Variations include variations in the location itself, variations in thickness of the part at the location, and variations in shape of the part at the location. Because of this capability, the disclosed machine can significantly minimize the percentage of finished parts which are out-of-tolerance.

The machine can also discover out-of-tolerance parameters which it discovers in a part before it conducts any operations on the part. In that way, a non-compliant part found unsuitable for performing operations on can be returned to its fabricator to see for itself that the part which was sent to be processed by the machine was non-compliant as sent.

The foregoing summary, accompanied by further detail of the disclosure, will be presented in the Detailed Description below with reference to the following drawings that are part of this disclosure.

BRIEF DESCRIPTION OF THE DRAWINGS

FIG. 17 is another view of the two dimensional image showing another step in the analysis.

FIGS. 18, 19, 20, 21, 22, and 23 illustrate a series of additional steps in the analysis.

FIG. 30 is a perspective view of another type of heating element for melting plastic.

FIG. 31 is a side elevation view of another hot plate.

FIG. 32 is a perspective view in the general direction of arrows 32-32 in FIG. 31.

DETAILED DESCRIPTION

Figure 1:
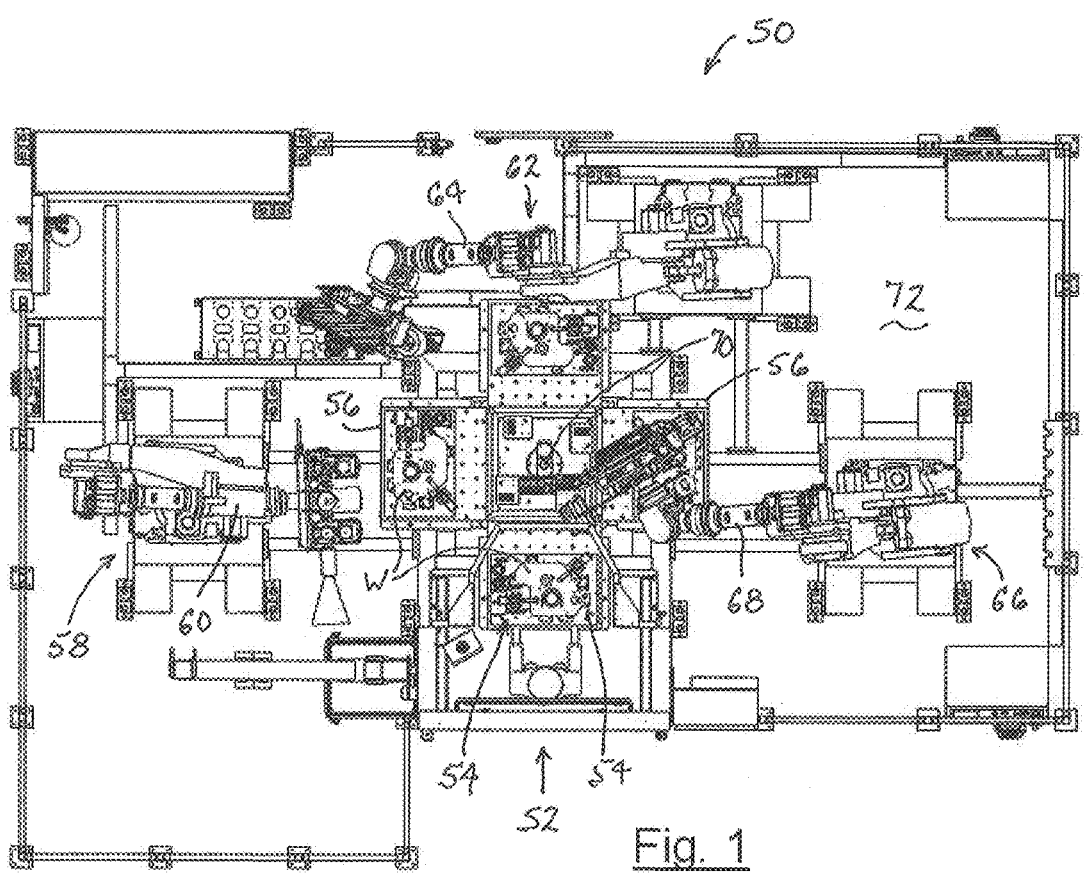
FIG. 1 is a schematic plan diagram of a four-station work station having robots at three of the stations for performing repetitive operations on workpieces.

FIG. 1 shows a workstation 50 having a loading/unloading station 52 at which a part to be processed (i.e. a workpiece W) is loaded into, and unloaded from, a fixture 54 on a turntable 56, a first processing station 58 comprising a first robot 60, a second processing station 62 comprising a second robot 64, and a third processing station 66 comprising a third robot 68.

Four fixtures 54 are mounted on turntable 56 at 90° increments about a central vertical axis 70 of the turntable, and stations 52, 58, 62, 66 are arranged on a workplace floor 72 at 90° intervals about axis 70. A prime mover indexes turntable 56 in precise 90° increments of rotation about axis 70 to advance a fixture containing a workpiece which has been secured at a fixed location on the fixture from one station to a succeeding station in the following manner.

After a workpiece has been secured in a fixture 54 at station 52, turntable 56 is indexed to advance the workpiece to station 58 for processing at the latter station while a workpiece which has been processed at station 58 is concurrently advanced to station 62 for processing at the latter station, a workpiece which has been processed at station 62 is advanced to station 66 for processing at the latter station, and a workpiece at station 66 is advanced to station 52 for unloading at the latter station. In this way each of the three stations 58, 62, and 66 performs a specific operation on a workpiece which arrives at the respective station before the workpiece is advanced to a succeeding station.

FIGS. 2, 2A, 3, and 4 show first robot 60 and a processing unit 74 which is securely fastened to an arm 76 of first robot 60 for movement by first robot 60 within an orthogonal coordinate system by translation of processing unit 74 along linear X, Y, and Z axes of first robot 60 and by rotation of processing unit 74 angularly in roll, pitch, and yaw about respective axes W, P, and R. First robot 60 is a commercially manufactured device known as a six-axis industrial robot having multiple motors which are operated by a controller 79 for positioning any device fastened to arm 76 within a coordinate system with six degrees of freedom (X, Y, Z, W, P, R). An example of such a robot is a Fanuc™ 125F.

Figure 2:
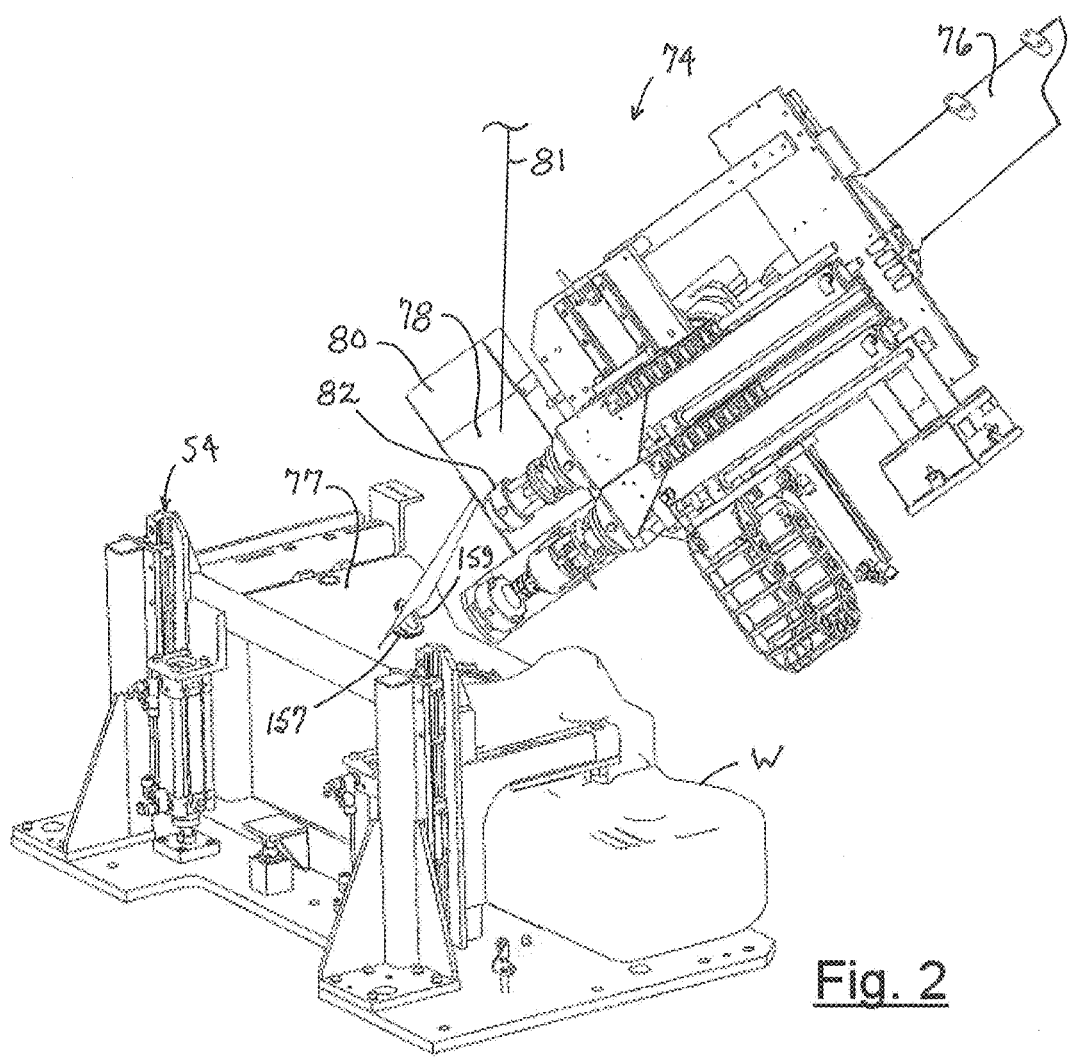
FIGS. 2 and 2A collectively show a perspective view of a first of three stations which have robots.
Figure 2A:
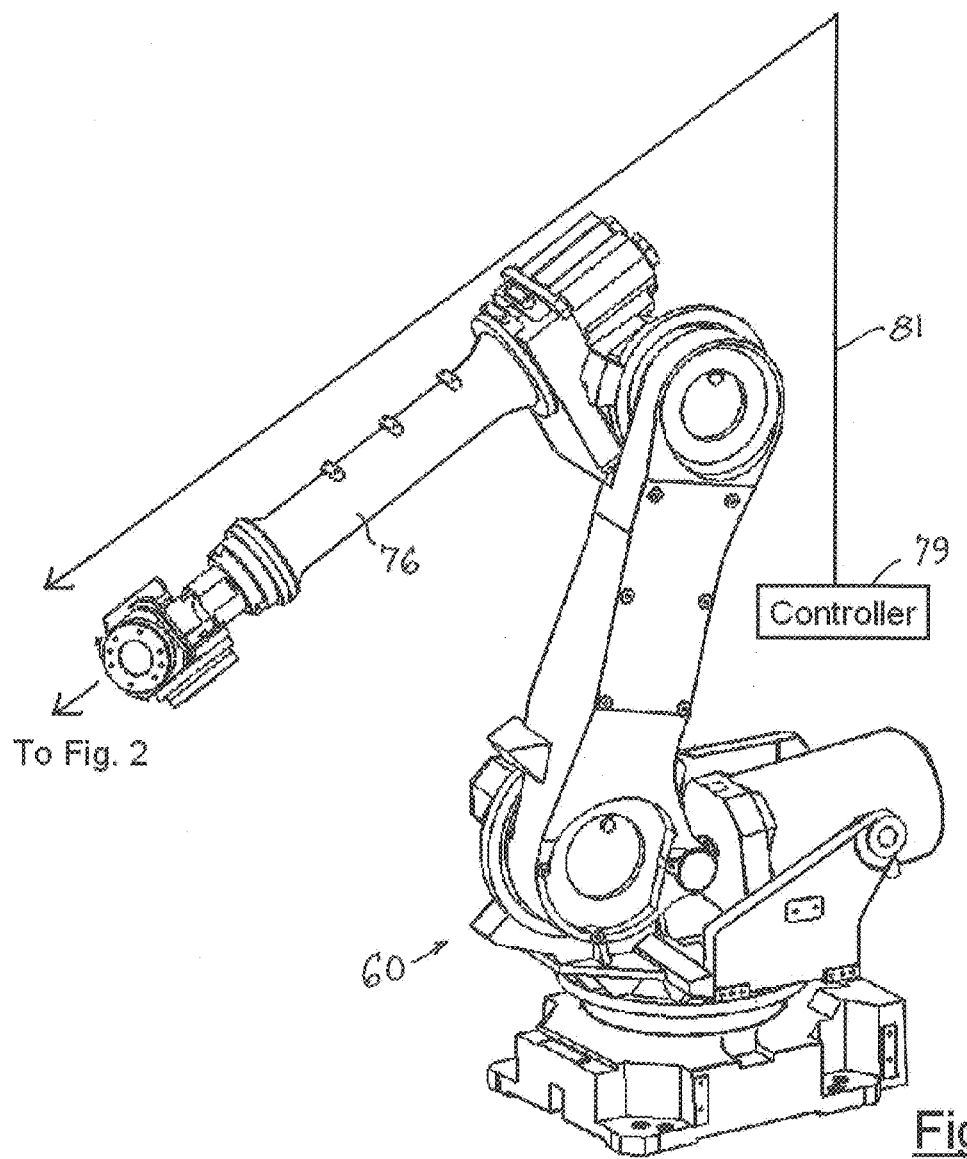

FIG. 2 shows a fixture 54 into which a workpiece W has been loaded. Fixture 54 holds the workpiece secure such that the workpiece is stabilized against movement on the fixture although certain portions of the workpiece may be slightly deformed by an operation being performed at any station depending on the nature of the construction of the workpiece and that of the operation being performed on it.

The particular example of workpiece W shown in FIG. 2 is a plastic tank 77 which has been manufactured by a co-extrusion process and which has a feature (feature of interest), common to all such tanks processed by workstation 50, on which first processing station 58 performs a prescribed operation or operations.

Processing unit 74 comprises a three-dimensional vision system, including a three-dimensional scanning camera 78, for acquiring X, Y, and Z coordinate data defining the feature of interest on a tank 77 which has arrived at first processing station 58, and a processor 80 for storing and processing data. Processor 80 and controller 79 can communicate with each other via a data link 81. However, before first processing station 58 is allowed to perform any operation on a succession of what are substantially identical tanks, coordinate data which defines a master location for the feature of interest is developed by what may be called a teaching process for first robot 60. The vision system has what is known as a "smart" camera which embodies both processor 80 and a scanner. A different vision system may have the processor located remotely from processing unit 74, such as in an electrical cabinet on a workplace floor.

The teaching process can be best explained in the following way.

To begin, a tank which is to be used in the teaching process is loaded into a fixture 54 and properly secured. The tank can be an exact master model of a tank or an actual tank which has been measured to assure that its relevant dimensions correspond sufficiently closely to the design intent represented by the master model that it can be considered equivalent to the master model. First robot 60 is operated to a coordinate position within the six-axis coordinate system described above which has been determined to be an appropriate starting point for camera 78 to begin a scan of a region of interest of the tank containing the feature of interest on which an operation would be performed. That starting point may be referred to as scan start position. First robot 60 then moves processing unit 74 along a scan path at a constant speed in a straight line, which also moves camera 78 in the same way, while camera 78 scans the region of interest. Processor 80 acquires data about the region of interest as the scan proceeds and from that data, by a process which will be more fully described later, develops X,Y,Z,W,P,R coordinate data which defines the master location for the feature of interest in a coordinate system of processor 80 and records that data in a flash drive of processor 80.

Next, first robot 60 is operated by controller 79 to place a tool 82 of processing unit 74 in a home position whose coordinates in the robot's coordinate system bear a specific positional relationship to the feature of interest. Tool 82 is an actual tool (or an exact replica) which would be used to perform a prescribed operation on the feature of interest in a fixtured tank. Controller 79 has controls which can be manually operated by a person to place tool 82 in the tool's home position. The tool's home position may, for example, be a master home position from which tool 82 would begin to perform a prescribed operation on the feature of interest in a fixtured tank.

With tool 82 in its master home position, its coordinates (X,Y,Z,W,P,R) are recorded in controller 79 to define the coordinates of the tool's master home position. Coordinates of the tool's master home position may be identical to coordinates of a master home position for first robot 60 if tool 82 is not movable on processing unit 74. The master home position for first robot 60 may be defined by the coordinates of the end of arm 76 to which processing unit 74 is affixed when first robot 60 is in its master home position.

When first robot 60 is positioned at its master home position, the coordinates of tool 82 are different from the coordinates of the end of arm 76 to which processing unit 74 is affixed because tool 82 is distant from the end of arm 76. When tool 82 is movable on processing unit 74, as will be eventually explained, the coordinates of tool 82, when at its master home position are determined by modifying the coordinates of the master home position of first robot 60 to take into account the position of tool 82 on processing unit 74 relative to the end of arm 76 to which processing unit 74 is affixed.

Next, tank 77 is removed from fixture 54 after which a second tank is loaded into the fixture and properly secured. The second tank is a part which has been manufactured by a mass-production process but is presently unfinished. The nature of the particular manufacturing process may inherently result in part-to-part variations, and if such variations are ignored, they may affect accuracy of finishing operations as explained above. First robot 60 is operated to position camera 78 at the same scan start position which was used for the scan of the prior tank. Robot 60 once again moves processing unit 74 from scan start position along the same scan path and in the same manner as it did during the scan of the previous tank to scan the region of interest of the second tank. Processor 80 acquires data about the region of interest as the scan proceeds and from that data develops X,Y,Z,W,P,R coordinate data about the feature of interest in the coordinate system of processor 80 and records that data in the flash drive of processor 80.

Processor 80 then calculates differences between the X,Y,Z,W,P,R coordinate data for the feature of interest developed from the second scan and the X,Y,Z,W,P,R coordinate data for the feature of interest developed from the first scan.

Those differences are then transmitted from processor 80 to controller 79 for use in controlling the robot's manipulation of processing unit 74 and of any movement of tool 82 on processing unit 74 during performance of the same prescribed operation on the second tank by applying the differences to re-locate the master home position to a modified home position from which tool 82 will begin to move when performing the prescribed operation on the second tank. For example, if the X-axis coordinate data for the feature of interest developed from the second scan is more positive than the X-axis coordinate data for the feature of interest developed from the first scan, the magnitude of the difference is added to the X-axis coordinate of the master home position so that any X-axis translation which is imparted to tool 82 during performance of the prescribed operation on the feature of interest in the second tank will begin at a modified home position which is offset from the master home position by the calculated X-axis difference. In that way, the prescribed operation on the feature of interest in the second tank will begin at the same position relative to that feature of interest as the master home position is relative to the feature of interest in tank 77. Similarly for such differences in the other five axes. If the X-axis coordinate data for the feature of interest developed from the second scan is less positive than the X-axis coordinate data for the feature of interest developed from the first scan, the magnitude of the difference is subtracted from the X-axis coordinate of the master home position to define the X-axis coordinate of the modified home position. Similarly for such differences in the other five axes.

Processor 80 compares data from the two scans by comparing the new X, Y, and Z data points which define the image of the feature of interest in the second scan with the saved X, Y, and Z data points which define the image of the feature of interest in the first scan. For each axis, the difference between the data points from the two scans is calculated. Processor 80 then calculates roll, pitch, and yaw data (W, P, R) from each scan by trigonometric calculations and then calculates W, P, and R differences between the scans, as will be more fully explained later.

Figure 3:
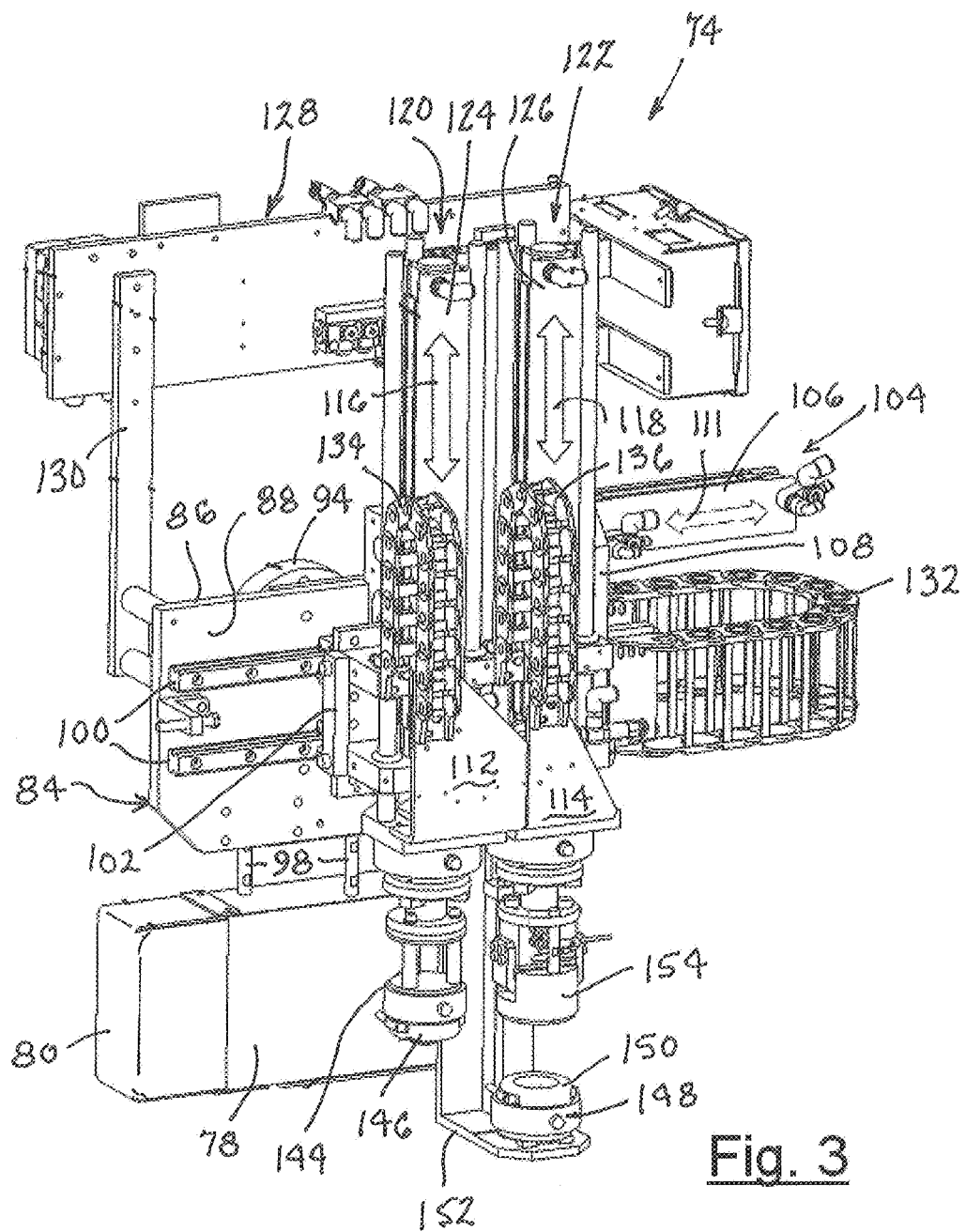
FIG. 3 is a perspective view of the front of a processing unit which is positioned by a robot at the first station.
Figure 4:
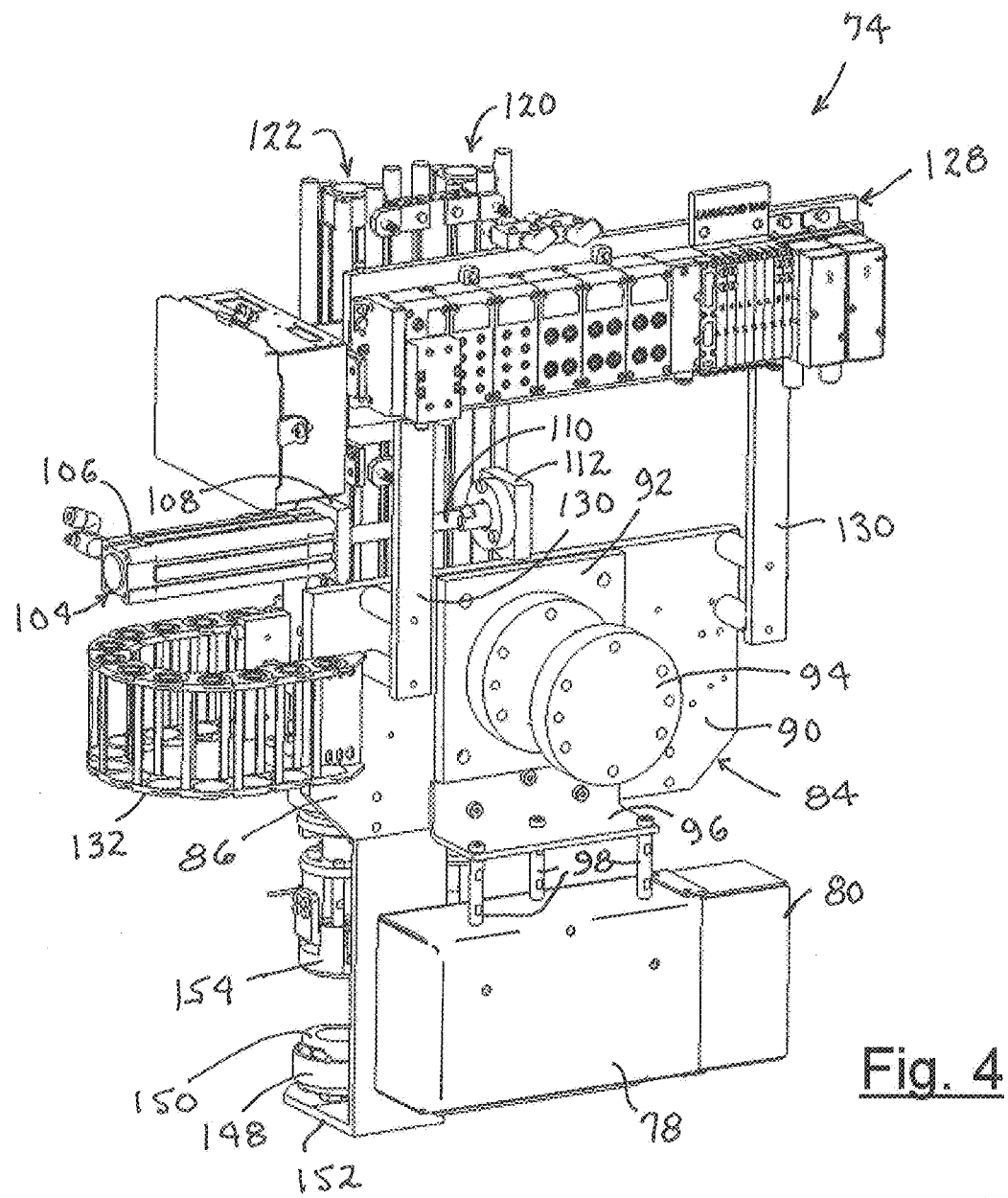
FIG. 4 is a perspective view of the rear of the processing unit shown in FIG. 3.

Processing unit 74 as shown in FIGS. 3 and 4 comprises a frame 84 which has a central plate 86 shown disposed in a generally vertical orientation. Central plate 86 has a front face 88 and a rear face 90. A robot mounting bracket 92 is disposed against rear face 90 and fastened to central plate 86. Robot mounting bracket 92 has a circular end plate 94 which is fastened to the distal end of robot arm 76 (robot's six axis arm).

Camera 78 and processor 80 are disposed vertically below and fastened to central plate 86 by a bracket 96 and posts 98 to dispose the camera and processor at an appropriate distance from the location where robot arm 76 is fastened to end plate 94.

A track 100 is disposed against front face 88 and fastened to central plate 86. A carriage 102 is retained on and guided by track 100 for back and forth travel in a straight line along the track. A pneumatic cylinder 104 has a cylinder body 106 mounted on central plate 86 by a bracket 108 and a cylinder rod 110 which extends out of cylinder body 106 into attachment with carriage 102 via a bracket 112 which is fastened to carriage 102. Cylinder rod 110 is displaced back and forth to move carriage 102 back and forth along track 100 as suggested by arrow 111.

A face of carriage 102 which is opposite track 100 contains two parallel tracks on which respective carriages 112, 114 are retained and guided for back and forth travel in straight lines along the respective tracks as suggested by arrows 116, 118. The tracks cannot be seen in the FIGS. because their view is blocked by other parts of processing unit 74.

Pneumatic cylinders 120, 122 have respective cylinder bodies 124, 126 mounted on central plate 86. A cylinder rod extends out of cylinder body 124 into attachment with carriage 112, and a cylinder rod extends out of cylinder body 126 into attachment with carriage 114. The cylinder rods cannot be seen in the FIGS. because their view is blocked by other parts of processing unit 74. Each cylinder rod can be independently displaced back and forth to move the respective carriage 112, 114 independently back and forth along the respective track.

A valve mounting panel 128 containing various pneumatic control valves is mounted via posts 130 on central plate 86. Connections from the valves to the pneumatic cylinders are not shown. Those connections, as well as other connections also not shown, such as electrical ones, are organized to follow travel of each of the three carriages by guidance which is constrained by respective chain links 132, 134, 136. Each chain link has a first end attached to frame 84 and a second end attached to a respective carriage. The connections enter at the first end and exit from the second end.

The coordinates of the position of tool 82 in the robot's coordinate system are a function not only of the coordinates of the position of the end of arm 76 but also a function of the position in which carriage 112 is placed by pneumatic cylinders 104, 120. Assuming that the position of arm 76 is defined by coordinates of the end of the arm, the location of carriage 112 on processing unit 74 is, as mentioned earlier, accounted for when the coordinates of the tool are being calculated. Respective sensors associated with the respective cylinders communicate data to controller 79 measuring the distance to which the respective cylinder rod is extended.

Figure 5:
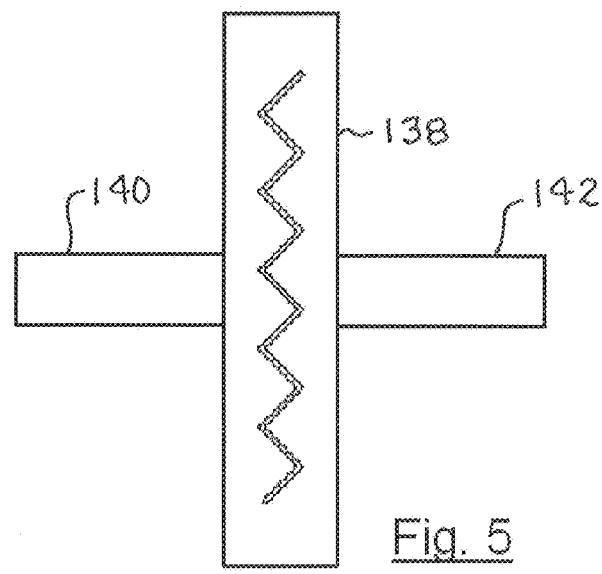
FIGS. 5, 6, and 7 schematically show steps of a hot plate welding process.
Figure 6:
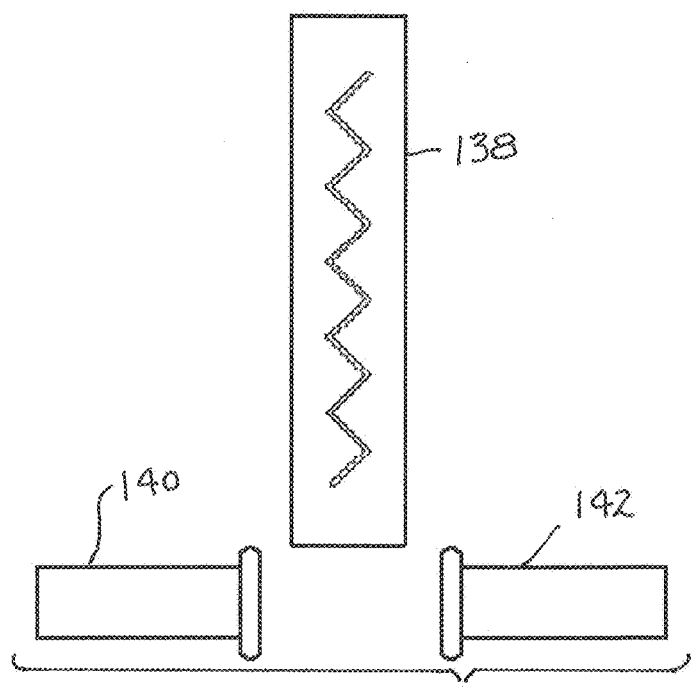
Figure 7:
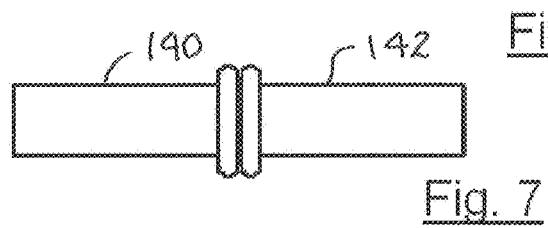

First processing station 58 performs a hot plate welding process in which tool 82 is a hot plate. A schematic example of hot plate welding is portrayed in FIGS. 5, 6, and 7. The process comprises a first phase (FIG. 5) in which a hot plate 138 is used to heat ends of a first plastic part 140 and a second plastic part 142 at which the parts will be welded together. The surface temperature of hot plate 138 and the duration for which it is in contact with the parts' surfaces create sufficient melting of those surfaces to enable the parts to be welded together. In typical plastic welding processes, the hot plate temperature is within a range from about 30° C. to about 100° C. above the temperature at which the plastic will melt. A second phase of the process (FIG. 6) is a changeover phase in which, after an end of each part 140, 142 has been melted, the parts are moved out of contact with hot plate 138. A third phase of the process (FIG. 7) is a fusion phase in which the ends of the parts which have been melted are first placed together under pressure to cause the melts to blend together and then are held in that position long enough, at the same or a reduced pressure, for the melts to cool and solidify, thereby completing the weld.

The nature of certain processes for mass-producing plastic parts can create dimensional differences from part-to-part, two examples of which are differences in wall thickness and differences in surface flatness. Such differences may be caused by variations in melt flow rate, humidity of raw materials, ambient temperature, etc. Other part-to-part differences involve a feature of interest on which an operation is to be performed and they include the feature's shape and its location in the robot's six-axis coordinate system. As long as differences between any given part and the specified design intent, as represented by master dimensions for the part, are within acceptable tolerances, that part is may be considered suitable for being welded to another part as long as that other part itself is also within tolerance of its design intent. Yet if the melted portions of the within-tolerance parts are mismatched when placed together during a welding operation, such mismatch may adversely affect quality of the finished weld.

A surface of a plastic part which is to be melted by a hot plate should ideally match the shape of a surface of the hot plate which will contact the part surface, and the hot plate surface and the part surface should be brought into full surface-to-surface contact at the exact location specified by the design intent. Failure to meet such requirements can adversely affect weld quality, and when plastic parts are being welded, part-to-part variations as described above can have such an effect on achieving consistent weld quality.

The disclosed system and method can provide more consistent weld quality by performing adjustments which compensate for part-to-part differences such as those described above.

When a plastic part is properly secured in a fixture and a hot plate surface is precisely positioned by a robot to the same coordinate location at which it is to make initial contact with a surface of the part intended to be melted, part-to-part differences as described above can result in mismatch between the part surface to be melted and the hot plate surface. If mismatch occurs, force being applied by the hot plate to a part will initially displace some melt before eventually conforming melted plastic to the hot plate geometry. Any melt which is displaced during this conforming, or matching, phase is incorporated into flash beyond the hot plate perimeter.

Processing unit 74 has a thermal imaging camera for taking a thermal image of a surface area of a part after it has been heated for a specified length of time to verify thermal distribution of a pool of material melted by a hot plate to assure that sufficient melting has been achieved for the welding process to be completed. The image is taken after the hot plate has been moved away. If the image shows that melt is insufficient, the process is terminated to avoid the possibility of making a bad weld.

After the melt has been conformed to the hot plate, the process proceeds as if full surface-to-surface contact had initially occurred. Force being applied to the part by the hot plate can be maintained, or reduced to some minimum, while the hot plate continues to remain in contact with the part.

Heat now penetrates into the part without any substantial displacement of melt. The temperature of the melt surface continues to rise slightly and eventually reaches about 20° C. below the surface temperature of the hot plate.

At the same time as a feature of the part is being melted, a feature of a second plastic part is being melted in a similar way, as explained earlier.

At the end of the melting phase, the change-over phase occurs by moving each part out of contact with the respective hot plate.

The fusion phase begins by pressing the parts together at their melts. The magnitude of the applied pressure depends on certain factors, such as melt viscosity and part wall thickness. The pressure can be maintained or reduced as the melts blend together and cool by heat flow from the melts both into the surrounding air and also more deeply into the interiors of the parts. The weld is complete once the temperature of the solidified melts has dropped significantly below the crystalline melting point or below the softening temperature. Quality of the finished weld is affected by the severity of any mismatch occurring when the hot plate initially contacted the plastic. By compensating for mismatch in any one or more of the axes of a six-axis coordinate system as disclosed herein, significant improvement of weld quality of mass-produced parts can be achieved.

The example of hot plate welding process which is portrayed by the drawings described above is performed at first processing station 58 where a circular flange 145 of a tube 143 (FIG. 13) is welded to a weld pad 157 (FIG. 2) of a tank 77.

Processing unit 74 comprises a first hot plate assembly 144 (FIG. 3) containing a first hot plate 146 and a second hot plate assembly 148 containing a second hot plate 150. First hot plate assembly 144 is fastened to carriage 112 for movement on processing unit 74. First hot plate 146 is used to melt a portion of weld pad 157 and is an example of a tool 82 whose position is controlled by controller 79 during performance of an operation on a workpiece. Second hot plate assembly 148 is mounted on one leg of a right angle bracket 152 whose other leg is fastened to central plate 86. Consequently second hot plate 150 is immovable, and therefore has a fixed location, on processing unit 74.

Figure 8:
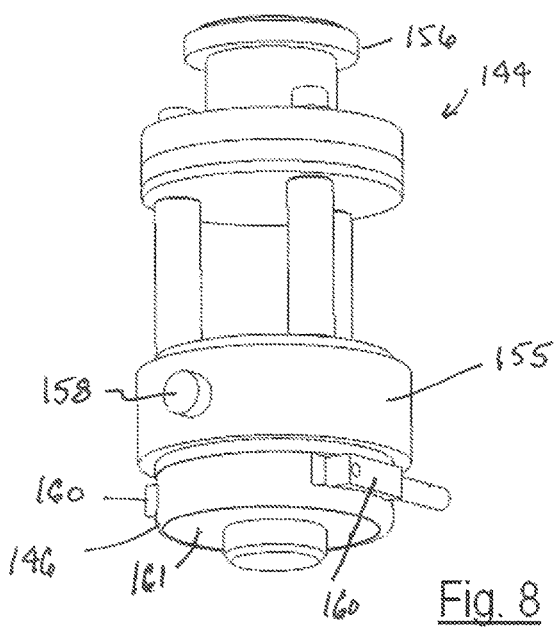
FIG. 8 is a perspective view of a hot plate assembly shown in FIG. 3.

First hot plate assembly 144 is shown by itself in FIG. 8 and comprises a proximal end 156 via which it is securely fastened to carriage 112. First hot plate 146 is at a distal end of assembly 144. Electric conductors (not shown) come from an electrical panel, enter and pass through chain link 134, and then pass out of chain link 134 to end at terminals 158 fastened to a circular side surface of a band heater 155. The conductors provide an electric current path for electricity to flow to and through band heater 155, heating first hot plate 146 in the process. Second hot plate 150 is heated in a similar manner. Resistance temperature detectors (RTD's) 160 are fastened 180° apart to a circular side surface of first hot plate 146 and used to monitor hot plate temperature and enable current to band heater 155 to be controlled for proper temperature regulation. A first RTD is used for actual control while the second is used as a redundancy check on the first.

A gripping tool 154 is securely fastened to carriage 114 for movement with that carriage on processing unit 74 toward arid away from second hot plate 150. Gripping tool 154 functions to grip a tube 143 and move the tube to contact a flat bottom surface of flange 145 with second hot plate 150 for melting a portion of the flange's bottom surface. Once sufficient melting has occurred, gripping tool 154 moves tube 143 off second hot plate 150.

Weld pad 157 is located within a region of interest in the wall of tank 77 and comprises a raised formation having a circular annular top surface 159 (FIG. 10) surrounding a circular hole 164 having a center 165. As will be further explained below, a portion of the wall underneath top surface 159 is melted by contacting surface 159 with a circular annular flat surface 161 of first hot plate 146 while at the same time the bottom of tube flange 145 is being melted by second hot plate 150. After sufficient melting of both flange and weld pad, gripping tool 154 removes tube 143 from second hot plate 150 and places the melted bottom of flange 145 in contact with the melted top of weld pad 157 so that the melts can blend and cool to completion, after which gripping tool 154 releases tube 143 and moves away.

Tank 77 is fabricated by blow molding of multiple plastic coextrusions in accordance with known processes. The fabricated tank comprises a multiple layer wall which has a basic shape which comprises a bottom wall, a side wall, and a top wall. The specific shape of each of these walls is determined by the shape of the interior of the mold cavity within which the blow occurs.

Various operations, such as welding and boring for example, may be performed on the blown tank to enable additional components to be assembled to the tank so that the tank can be used in the environment for which it is intended, such as a fuel canister or a fuel tank in a motor vehicle.

When a canister or tank is intended to hold a volatile liquid such as gasoline, the multiple layer coextrusion commonly includes one extrusion which in the blown canister or tank provides an EVOH layer 163 which serves as a hydrocarbon barrier for preventing volatile gases from escaping through the wall of the canister or tank.

Figure 9:
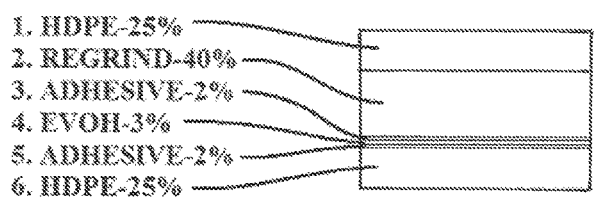
FIG. 9 is a legend showing layers of a wall of a co-extruded blow-molded tank for holding volatile liquid fuel.
Figure 10:
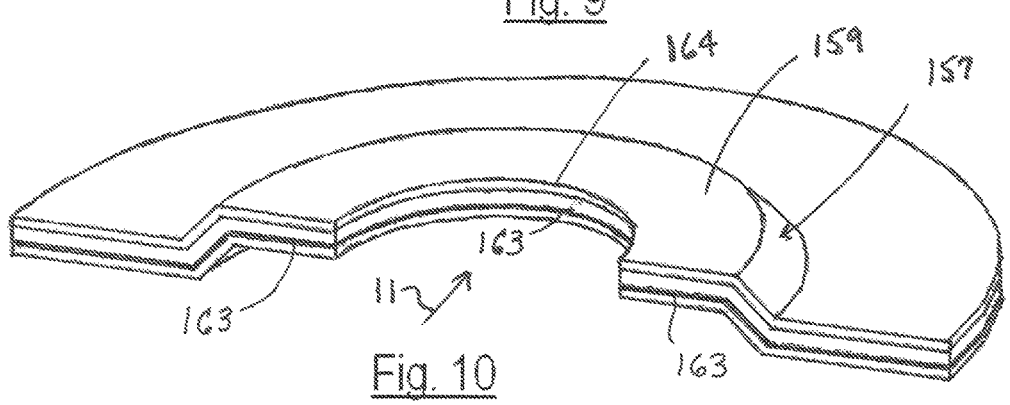
FIG. 10 is a fragmentary perspective view of a master shape for a feature of interest in the wall of the tank of FIG. 2 including a cross section through the feature of interest.
Figure 11:
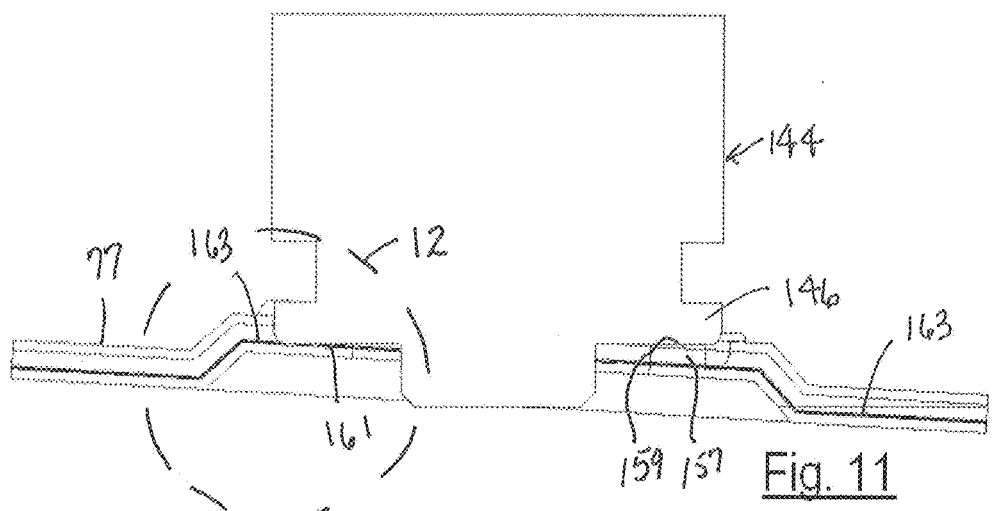
FIG. 11 is a view in the direction of arrow 11 in FIG. 10 and includes the hot plate assembly of FIG. 8 melting the feature of interest in the tank wall.

FIG. 10 illustrates a portion of the tank wall at weld pad 157 and its six coextruded layers. FIG. 9 describes those layers and shows the relative thickness of each layer as a percentage of the total wall thickness. Even though the EVOH layer 163 is closer to the interior surface of the tank wall than the exterior surface, the EVOH layer is potentially at risk of being breached if it should be contacted by hot plate 146 during the melting phase of a welding operation due to excessive mismatch of the hot plate to the wall during melting. An example of angular (W, P, R) mismatch is illustrated in FIGS. 11, 12, and 13.

Figure 13:
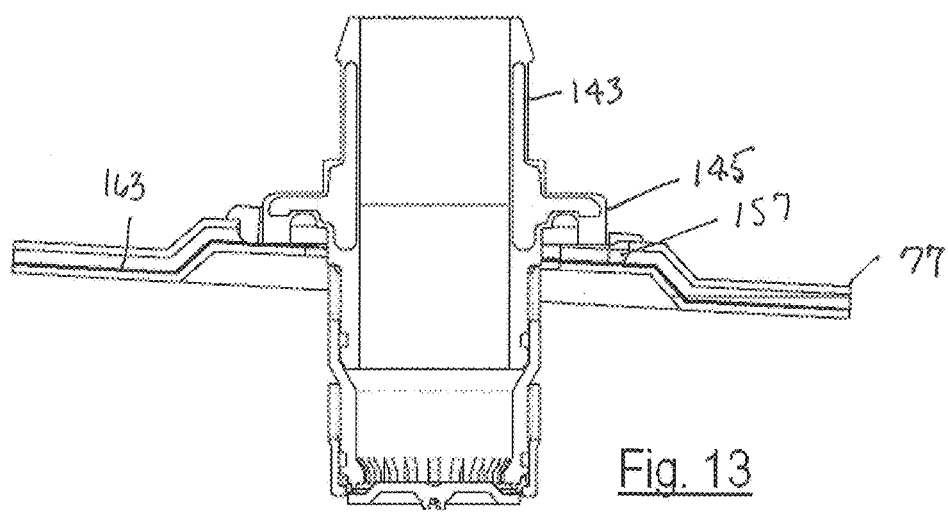
FIG. 13 is cross section view of the feature of interest after the hot plate assembly has been removed and a tube has been welded to the feature of interest.

FIG. 13 illustrates weld pad 157 and tube 143 after having been welded together as explained above. In this example, the orientation of flange 145 is angularly tipped (i.e. not parallel) relative to the underlying weld pad 157 to which it has been welded. The tipping is the result of angular mismatch between weld pad surface 159 and surface 161 of first hot plate 146 which caused a portion of the circumference of surface 161 to penetrate the wall more deeply than elsewhere around the circumference, and as a consequence breach a portion of EVOH layer 163. Although a melted portion of tube flange 145 is placed onto a melted portion of weld pad 157, the finished weld may not seal the breach and consequently be defective.

Figure 12:
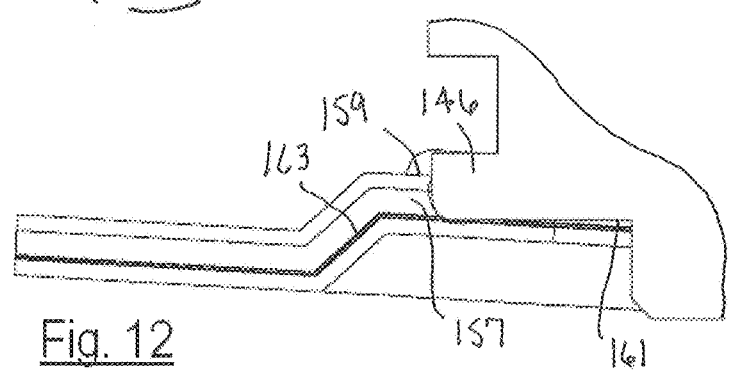
FIG. 12 is an enlarged fragmentary view in circle 12 of FIG. 11.

FIG. 12 illustrates an example of how such angular mismatch can potentially damage EVOH layer 163 if hot plate surface 161 comes into contact with the EVOH layer. Locational (X, Y, Z coordinate) mismatch is not present in this example, but if present, could potentially damage weld pad 157 if hot plate 146 were to make inaccurate contact with surface 159.

Due to part-to-part variations, the X, Y, Z coordinates of a feature of interest, such as weld pad 157, on which a tool, such as first hot plate 146, is to perform one or more operations, can vary as much as about ±½" when the workpiece is placed in a fixture associated with a machine that controls the operation of the tool. Also angular mismatch between a feature of interest and a tool in W, P, and R coordinates can vary up to about ±3°.

Robot 60 and processing unit 74, as described above, are capable of compensating for such mismatches and thereby enable a repetitive operation of a mass-production process to be performed with more consistent accuracy from part to part. Such a capability provides higher quality finished parts and can significantly reduce, or even eliminate, production of non-compliant parts.

The manner of compensating for both locational (X, Y, and Z coordinate) mismatch and angular (W, P, R coordinate) mismatch has been explained earlier in a general way. Further detail will now be presented with reference to the example involving tank 77 and tube 143.

Figure 14:
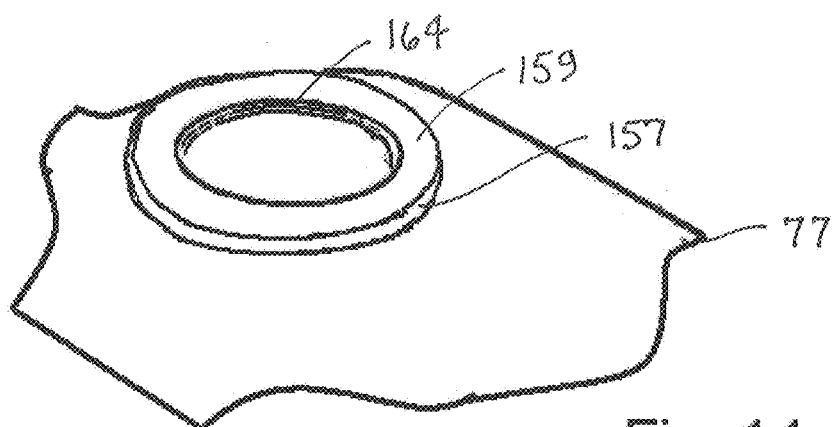
FIG. 14 is a three dimensional image display resulting from a scan of an area of the tank containing the feature of interest.

Robot 60 operates to position processing unit 74 at a starting location and then move processing unit 74 along a defined path while camera 78 scans an area which should contain the region of interest. During a scan, robot 60 moves processing unit 74 along the same path but because of part-to-part variations, the coordinates of the feature of interest can vary. The completed scan contains coordinate data for the region of interest which can be visually portrayed on a two-dimensional screen as a three-dimensional image which can be manipulated for viewing from different directions. FIG. 14 shows a two-dimensional image of weld pad 157 as viewed from one direction, but the actual scan data from which the image was developed contains X, Y, and Z coordinate data. FIG. 14 is presented to facilitate the reader's understanding of how processor 80 functions, and the fact that the scan data can be portrayed as it is in FIG. 14 should not be construed to imply that such an image is actually created as a matter of necessity. It is from the X, Y, Z scan data that W,P,R coordinate data is obtained as mentioned earlier and as will be more fully explained later.

Figure 15:
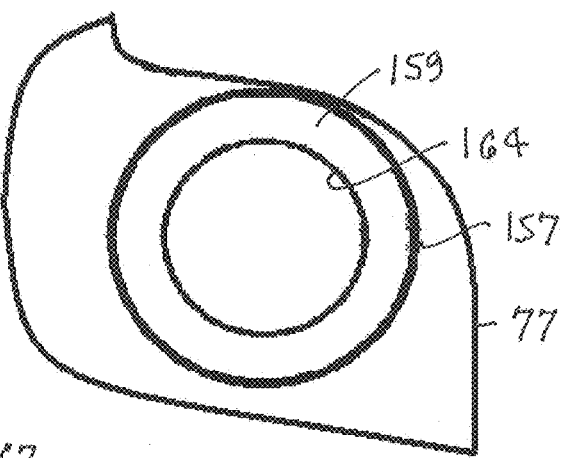
FIG. 15 is a two dimensional image developed from the three dimensional image display.

Processor 80 contains stored master data for any one or more geometric aspects which uniquely define the feature of interest. In the present example, those geometric aspects of weld pad 157 are annular surface 159 and hole 164 (an annulus surrounding a hole). For each tank 77, processor 80 uses the master data for those geometric aspects to identify the feature of interest in the scan data. Once the feature of interest has been identified, processor 80 derives a two-dimensional X, Y image (FIG. 15) from the X, Y, Z scan data. As suggested by FIG. 2, the path of the scan is generally parallel with annular surface 159. Consequently, the X, Y scan data lie in a plane which is parallel with the scan path while Z scan data for each X, Y data point is perpendicular to that plane. Z coordinate data can be obtained by use of the gray scale method.

Figure 16:
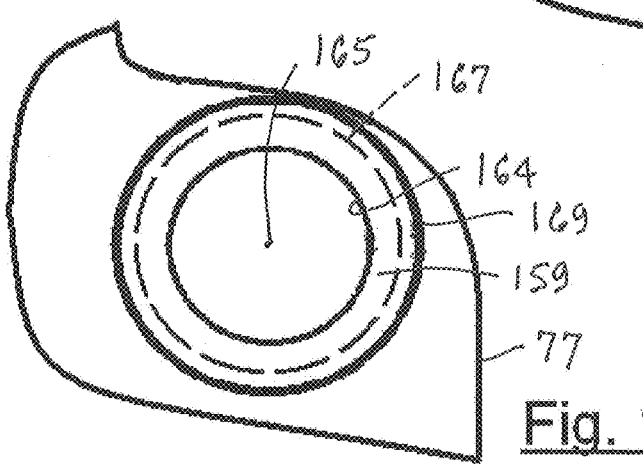
FIG. 16 is another view of the two dimensional image showing a step in an analysis of the image.

Using the X, Y master data for surface 159 and hole 164, Processor 80 analyzes the X, Y scan data to locate surface 159 and hole 164. If they are not located, they are considered too far out of tolerance for surface 159 to be melted. In the present example, the analysis takes place within a defined area circumscribed by an imaginary circle 167 shown in FIG. 16. Imaginary circle 167 is defined by data in processor 80 and has a diameter greater than that of hole 164 and can be greater than an outer perimeter 169 of surface 159 depending on the part geometry and feature of interest. If the analysis discloses that surface 159 and hole 164 lie within the defined area, processor 80 uses X, Y scan data to calculate the hole's cross sectional area for comparison with the master data to determine if the hole size is within tolerance and to determine X, Y coordinate data for center 165 of hole 164.

Processor 80 also contains X, Y data defining two concentric imaginary circles 173, 175 (FIG. 17) whose pre-set diameters bound an annulus 177 representing an area of surface 159 which is to be melted. The center of annulus 177 is centered on a center 166. Processor 80 places center 166 on X,Y coordinate data for center 165 of hole 164 to cause annulus 177 to overlie a portion of surface 159, thereby defining the annular zone of surface 159 within which Z coordinate data is then obtained by the gray scale method mentioned above.

FIG. 18 shows a curved line 179 representing Z-axis coordinate data obtained for surface 159 at each of a number of X, Y locations around the defined annular zone. The example in FIG. 19 uses twenty-eight X, Y locations at which Z-axis data is obtained. Using the Z-axis coordinate data at those locations, processor 80 calculates a "best fit" plane 181 for fitting to that data. Some portions of curved line 179 are above plane 181 while other portions are below plane 181, and while plane 181 is shown horizontal in FIG. 18, whether it is or is not horizontal depends on the geometry of surface 159 as determined by the Z-axis data which define it. In any event, X, Y, Z coordinates of any point on plane 181 are established and the Z coordinate value can be calculated from the Z coordinate value for the same X,Y coordinate on curved line 179 by algebraically adding the Z-axis distance between plane 181 and curved line 179 which is negative at an X,Y location where line 179 is below plane 181 and positive at an X,Y location where line 179 is above plane 181.

Now that plane 181 has been defined in X, Y, Z coordinates, W, P, R coordinates can be calculated. How this is done is described with reference to FIGS. 21-23.

Figure 21:
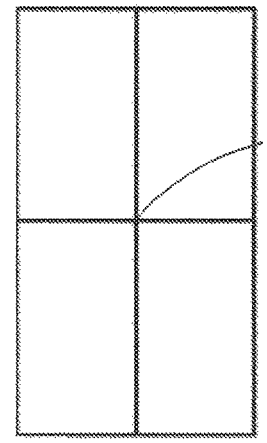

Three points on plane 181 are selected. FIG. 21 shows a first point 185 at the center of the crosshairs. The X, Y, Z coordinates of that point appear in the accompanying chart 187 to the left.

Figure 22:
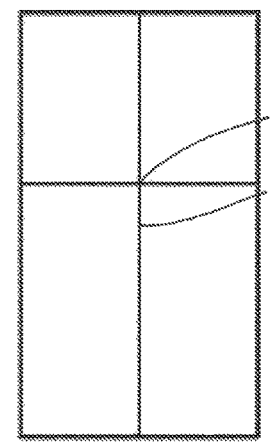

FIG. 22 shows a second point 189 spaced along the Y axis a distance (25 mm in the example) from first point 185. The X, Y, Z coordinates of second point 189 appear in the accompanying chart 191 to the left. The difference between the Z-axis coordinate of second point 189 and that of first point 185 is calculated. Using principles of trigonometry, the tangent of the ratio of that difference to 25 mm is calculated and that tangent defines a pitch angle.

Figure 23:
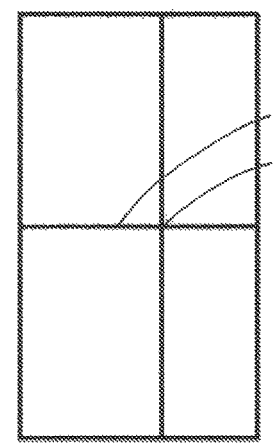

FIG. 23 shows a third point 193 spaced along the X axis a distance (25 mm in the example) from first point 185. The X, Y, Z coordinates of third point 193 appear in the accompanying chart 195 to the left. The difference between the Z-axis coordinate of third point 193 and that of first point 185 is calculated. Using principles of trigonometry, the tangent of the ratio of that difference to 25 mm is calculated and that tangent defines a roll angle.

Figure 24:
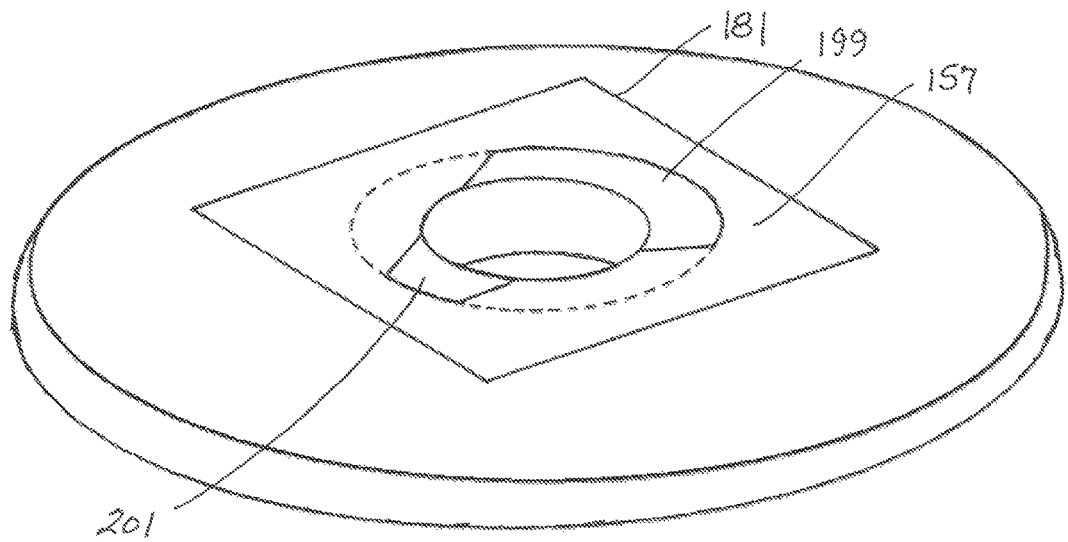
FIG. 24 is a perspective view showing diagrammatically an example of a result of the analysis.
Figure 25:
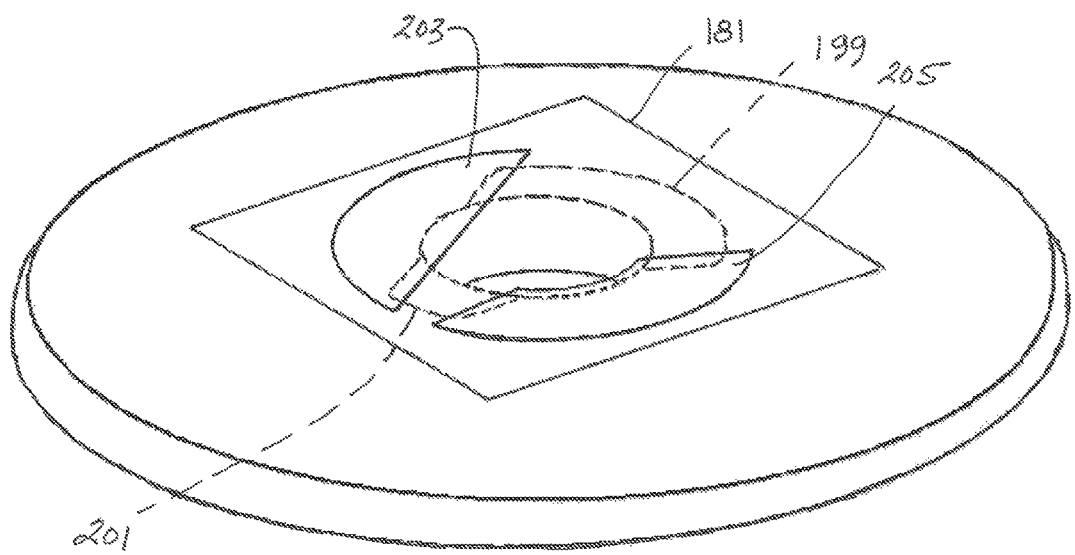
FIG. 25 is a perspective view showing diagrammatically how the result of the analysis is used to orient a hot plate to the feature of interest.

FIG. 24 shows the best-fit plane 181 passing through weld pad 157. The two zones 199, 201 are portions of surface 159 which overlie plane 181. FIG. 25 shows two zones 203, 205 which are below surface 159 and which will have to be melted in order to enable a good weld to be achieved. Hot plate surface 161 is positioned by robot 60 to be parallel to best-fit plane 181 as the hot plate moves toward weld pad 157. During the matching phase, some melted plastic is displaced until surface 159 becomes fully matched to the underlying portion of the weld pad which is to be heated. This is portrayed in a general way in FIG. 26 where displaced plastic is indicated by the numeral 207. Once surface 161 is fully matched to the plastic, the hot plate need not be advanced further.

Surface flatness is a factor which deserves consideration in a welding process and should be taken into account especially when a weld is to provide a hermetic seal. If its flatness is excessive, a weld surface may be distorted enough to look like a "potato chip". Curved line 179 and best-fit plane 181 are used to calculate a flatness value for surface 159 in a way analogous to running a depth gauge along the surface and taking depth measurements at a number of locations, as suggested by FIGS. 19 and 20. Instead of using a gauge however, the distance between plane 181 and a point on curved line 179 which is farthest above plane 181 and the distance between a point on curved line 179 which is farthest below plane 181 is calculated by processor 80 (FIG. 19). The sum of those distances is defined as the flatness value for surface 159 (FIG. 20).

Standard pre-set matching/heating times for properly melting a weld pad 157 may be insufficient to conform the portion to be melted to the hot plate geometry if the flatness value for the weld pad is too great. While a flatness value such as 0.2 mm may be suitable for standard pre-set melt times, a flatness value can often vary between 0.5 and 1.0 mm due to molding warpage.

If parameters such as time, temperature and pressure are set for all welds based a nominal 0.5 mm flatness value, surfaces having flatness values close to a 0.5 mm may be properly melted. However, surfaces having significantly smaller flatness values are apt to be melted too much, unnecessarily displacing material. On the other hand, surfaces having significantly greater flatness values would be insufficiently melted. Processor 80 allows the hot plate to perform the prescribed operation on a workpiece when the flatness value lies within a flatness tolerance range and disallows the hot plate from performing the prescribed operation when the flatness value does not lie within the flatness tolerance range. When processor 80 allows the prescribed operation to be performed on workpieces, the flatness value for each surface 159 is used by robot controller 79 to set at least one parameter for the prescribed operation, such as controlling the cycle time of the matching/heating phase so that proper melting occurs.

Figure 26:
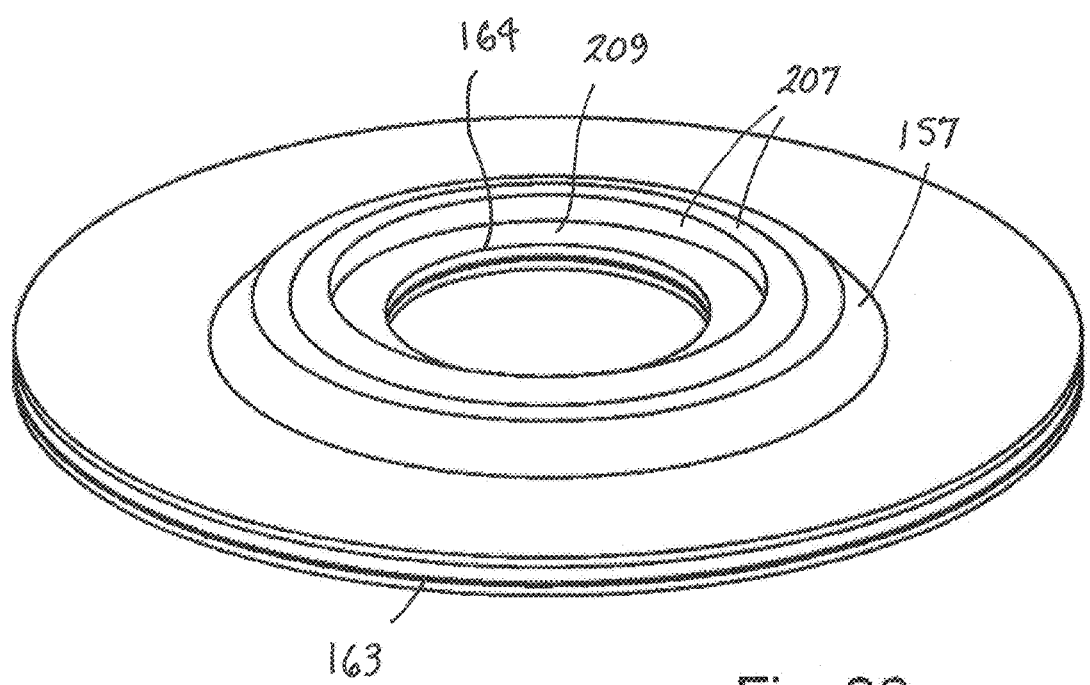
FIG. 26 is a perspective view showing diagrammatically how melted material may be displaced by the hot plate during a matching phase of the melting process.

For example, depending on the measured flatness value, for each 0.1 mm value that the flatness varies, another 2 seconds of time can be added or removed (if we consider 0.5 mm as a nominal value) to overcome this. If thirty seconds is required to melt a weld pad having a 0.5 mm flatness value, a weld pad having a 0.7 mm flatness value, the time parameter would be thirty-four seconds. This would provide nominal material displacement and complete surface melt as shown in FIG. 26 where plastic which has been displaced as flash during the matching phase is indicated at 207 and conformed melting at 209. Smaller flatness value provide for shorter cycle times since the material does not need to be displaced as much in order to cover the entire weld pad area. Parts out of flatness require more matching time in order to displace all of the material and then heat the material on the bottom of the surface once the matching phase is finished.

Thickness of a weld pad wall is another variable inherent in a blow molding process. Measuring wall thickness allows the position of the EVOH layer to be determined. This can be done by a measuring device mounted on processing unit 74. After processing unit 74 has completed a scan of a weld pad, wall thickness at several locations around the weld pad is measured. Processor 80 is operable to allow the hot plate to perform the prescribed operation on a workpiece when the measures of thickness lies within a thickness tolerance range and to disallow the prescribed operation from being performed when a measure does not lie within the thickness tolerance range The EVOH layer represents approximately 3% of the total wall thickness and if manufactured correctly, it is located at 70% of the wall below surface 159. Hence, in a wall having a 7.0 mm thickness, the EVOH layer should be at a depth of 4.9 mm from surface 159.

The ability to measure wall thickness and locate the EVOH layer enables accurate calculation of the quantity of material required to be displaced during the matching phase (calculated from flatness value) and the quantity of material in the weld pad to be melted so that the EVOH layer is not breached.

If wall thickness is measured at three locations as: 7.0 mm, 6.5 mm, & 6.0 mm (6.0 mm being a minimum value for a worst case scenario), the EVOH layer depth should be 4.2 mm. If the flatness value is 0.5 mm, the depth would be 3.7 mm due to material displacement. This leaves 5.5 mm (6.0 mm −0.5 mm) of the wall thickness available for melting without breaching the EVOH layer. If the heating phase melts material to a depth of 2.0 mm, 1.7 mm of material above the EVOH layer is not melted and the EVOH layer is not breached.

Figure 27:
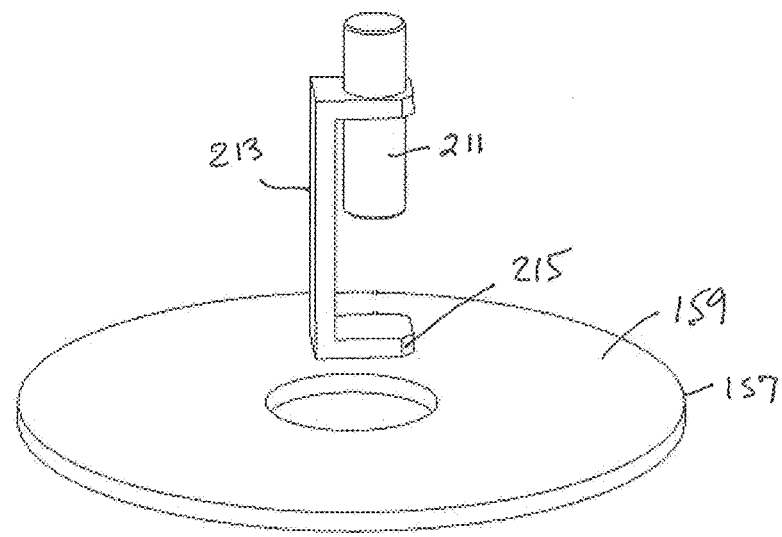
FIGS. 27, 28, and 29 illustrate a sequence of steps in measuring wall thickness of the tank at the feature of interest.
Figure 28:
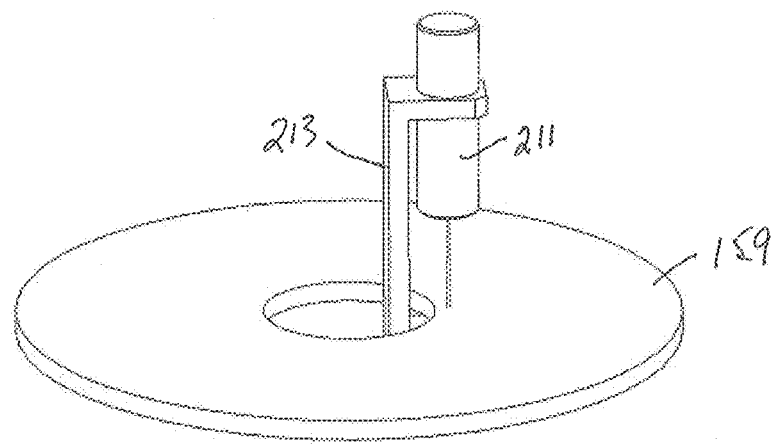
Figure 29:
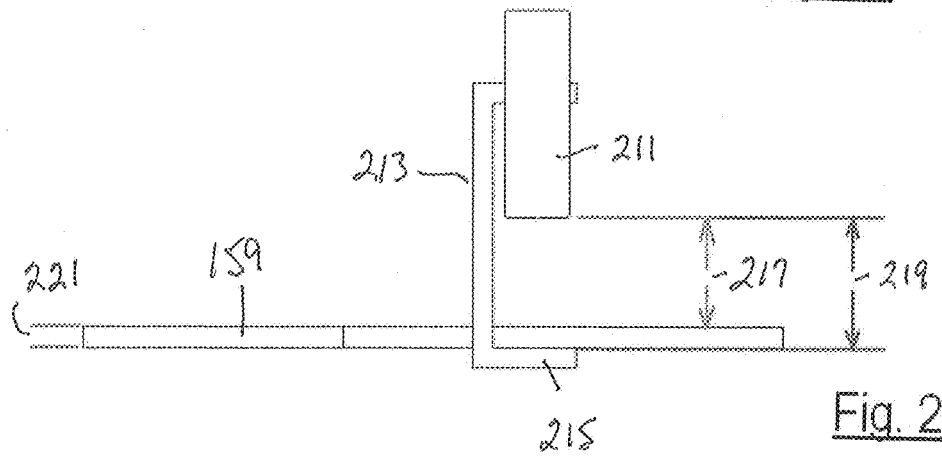

FIGS. 27, 28, and 29 show one way to measure wall thickness. A laser sensor 211 is mounted on a bracket 213 which is itself mounted on processing unit 74. Robot 60 positions bracket 213 such that a top surface of a foot 215 of the bracket is placed against the interior surface of the weld pad wall as in FIG. 29. Sensor 211 emits a beam (FIG. 28) which provides a measurement of the distance 217 from the sensor to surface 159 of weld pad 157. The distance 219 from the sensor to the top surface of foot 215 is known. The difference 221 between distances 219 and 217 is the thickness of the tank wall at the location of the weld pad.

Another component which can be used for plastic welding is a laser temperature probe which measures temperature of a component which is to be heated and uses the measurement to automatically re-adjust parameters. Cold components have their own set of parameters which are used for processing and will need longer heat cycle time than warmer components. Temperature of warmer components allows for the heat cycle time to be decreased. For example, if a cold component requires 30 seconds of heat cycle time, a warmer component at 70° C. might require only 25 seconds of heat cycle time because residual heat is already present in the component. Algorithm calculations can provide time parameter based on the temperature measured.

Short wave and medium wave infrared (IR) is another welding method which is similar to hot plate welding. The surfaces of the components to be joined are not placed in contact with a hot plate but rather are heated by direct IR exposure for a sufficient length of time to melt portions of the components which are to be joined. Once the surfaces have been sufficiently melted, the IR source is withdrawn from the components, they are then placed together at their melts, and the melts are allowed to solidify. Whether standard or custom IR heating elements are used in order to conform to part geometry, distance at which an element is spaced from a component is controlled. An example of an IR bulb 229 is shown in FIG. 30.

Standard industry practices do not allow for more than 0.5 mm deviation from a set nominal distance to a surface being heated. The time and power parameters are changed if the deviation is greater. Because IR welding is a non-contact method of plastic joining, flatness values calculated in the manner described above can be used to change the time parameter. Larger flatness values will increase the heating time, while smaller ones will decrease the heating time. The process described above enables an IR element to be properly oriented to the surface to be heated and to be placed at an appropriate distance from that surface.

The process described above can be applied to heating a non-planar surface. FIGS. 31 and 32 show a hot plate 230 which, unlike the flat planar surface 161 of hot plate 146, has a non-planar heating surface 232 which surrounds a cavity 234. Surface 232 is electrically heated in the same way as surface 161 of hot plate 146 by the use of standard industry heaters such as flexible heaters, band heaters or cartridge heaters.

A component (not shown) has a surface be heated whose shape corresponds to surface 232. The component's surface whose shape corresponds to surface 232 is the feature of interest and can be uniquely identified by its shape at certain locations around that surface.

The system which has been described can be used in multiple robot workstations, such as in FIG. 1, where the positional differences calculated at the first workstation are transmitted to subsequent robots at workstations to which a fixtured workpiece is advanced for additional operations. By advancing a fixtured workpiece from the first workstation to a second workstation with sufficient accuracy to place the fixture at the same location relative to the robot at the second workstation as the fixture was to the robot at the first workstation, the controller at the second workstation can use those differences to modify the master home position and create a modified home position for its tool. Consequently, the second workstation need not have a scanning camera nor perform a scanning process on a workpiece. Other process parameters such as surface flatness and wall thickness can also be transmitted with adjustments being made in real time.

While the embodiment which has been illustrated and described performs an operation on a workpiece by moving the tool relative to a stationary workpiece, principles disclosed herein may be applied to an embodiment in which the tool is stationary and the fixtured workpiece is movable relative to the stationary tool. In the embodiment which has been illustrated and described, camera 80 is movable with, but not movable on, processing unit 74. However camera 80 could be movable on processing unit 74 in the same way as tool 82 is movable on processing unit 74. In that case, coordinates of the position of camera 80 in the robot's coordinate system would be a function not only of the coordinates of the position of the end of arm 76 but also a function of the position of camera 80 on processing unit 74. The ability to move camera 80 on processing unit 74 would allow a scan of a feature of interest on a part to be made by movement of the camera alone while the end of robot arm 76 remains stationary.

The principles disclosed herein are adaptable to tooling for performing operations other than hot plate melting of plastic. Examples of other operations include, but are not limited to, assembly, drilling, and cutting operations.

What is claimed is:

1. A method of compensating for dimensional variations in mass-produced workpieces at a workstation which comprises a processing unit having a vision system and a tool for performing an operation on a workpiece which is held in a fixed location on a fixture, the vision system having a three-dimensional scanning camera for scanning workpieces and a processor for developing from scans of workpieces, coordinate data about workpieces within a coordinate system of the vision system, a robot operable by a controller to move one of the fixture and the processing unit relative to the other of the fixture and the processing unit within a three-dimensional orthogonal coordinate system of the robot by translation along X, Y, and Z axes which intersect at an origin of the coordinate system and by turning angularly about each of the X, Y, and Z axes, the method comprising:

securing a master workpiece in the fixed location on the fixture;

moving the scanning camera to a scan start position and then from the scan start position along a scan path while the scanning camera scans a region of the master workpiece which contains a feature on which the tool would perform an operation, the feature comprising a surface having a two-dimensional area defined by X-axis and Y-axis coordinate data, and at locations within the two-dimensional area, the surface being further defined by Z-axis coordinate data;

developing from a scan of the region of the master workpiece, master coordinate data for the feature in the coordinate system of the vision system;

moving the tool to a master home position for the tool in the robot's coordinate system from which the tool would begin to move along a prescribed operating path for performing a prescribed operation on the feature and recording coordinate data for the master home position in the robot's coordinate system;

removing the master workpiece from the fixture and securing an unfinished workpiece in the fixed location on the fixture;

moving the scanning camera to the scan start position and then along the scan path while the scanning camera scans a region of the unfinished workpiece which is expected to contain a feature substantially identical to the feature of the master workpiece;

developing from the scan of the region of the unfinished workpiece, coordinate data for the feature of the unfinished workpiece in the coordinate system of the vision system;

in the processor, calculating differences between the coordinate data for the feature from the scan of the region of the unfinished workpiece and the coordinate data for the master home position, and transmitting the calculated differences to the controller; and in the controller, creating a modified home position for the tool in the robot's coordinate system by modifying the coordinate data for the master home position for the tool by the differences transmitted to the controller, moving the tool to the modified home position and then moving the tool from the modified home position along the prescribed operating path as the tool performs the prescribed operation on the unfinished workpiece.

2. The method set forth in claim 1 in which moving one of the fixture and a processing unit relative to the other of the fixture and the processing unit comprises moving the robot relative to the fixture.

3. The method set forth in claim 2 further comprising transmitting the calculated differences to a controller at a subsequent workstation which operates a robot within a coordinate system and which contains a master home position for a tool of the subsequent workstation which performs an operation on workpieces at the subsequent workstation, advancing the fixture holding the unfinished workpiece to the subsequent workstation, in the controller at the subsequent workstation, creating a modified home position for the tool of the subsequent workstation by modifying the master home position for the tool of the subsequent workstation by the calculated differences and operating the robot at the subsequent workstation to place its tool in its modified home position and then cause its tool to move from its modified home position along a prescribed operating path as its tool performs a prescribed operation on the unfinished workpiece.

4. The method set forth in claim 1 comprising using the controller to also control at least one actuator on the processing unit which positions the tool on the processing unit.

5. The method set forth in claim 4 in which using the controller to also control at least one actuator on the processing unit which positions the tool on the processing unit comprises controlling a first actuator to position the tool on the processing unit along a first axis and controlling a second actuator to position the tool on the processing unit along a second axis.

6. The method set forth in claim 1 in which the tool performs the prescribed operation on the unfinished workpiece by melting material of the unfinished workpiece.

7. The method set forth in claim 6 further comprising taking a thermal image of material of the unfinished workpiece which has been melted by the tool and verifying thermal distribution of a pool of material melted by the tool.

8. The method set forth in claim 6 further comprising measuring temperature of the unfinished workpiece before the tool begins to melt material of the unfinished workpiece and controlling length of time for which the tool melts material of the unfinished workpiece as a function of measured temperature.

9. The method set forth in claim 1 in which the processor contains data defining the surface of the feature of a workpiece in X,Y coordinates, identifies X,Y coordinate data for the surface of the feature in the scan of the unfinished workpiece, and from the identified X,Y coordinate data, uses Z-axis coordinate data from each of multiple X,Y locations within the surface of the feature in the scan of the unfinished workpiece to define a best-fit plane which best fits a surface of the tool to the surface of the unfinished workpiece.

10. The method set forth in claim 9 in which the processor contains data defining the surface of the unfinished workpiece as an annulus surrounding a hole and uses Z-axis coordinate data from each of multiple X,Y locations disposed circumferentially around the annulus to define the best-fit plane which best fits a surface of the tool to the annulus of the unfinished workpiece.

11. The method set forth in claim 10 comprising, in the processor, calculating Z-axis distance between the Z-axis coordinate of the surface of the unfinished workpiece and the Z-axis coordinate of the best-fit plane at each of the multiple X,Y locations within that surface of the unfinished workpiece in the scan of the unfinished workpiece, and using those Z-axis distances to calculate a flatness value for the surface of the unfinished workpiece.

12. The method set forth in claim 11 comprising allowing the tool to perform the prescribed operation on the unfinished workpiece when the flatness value lies within a flatness tolerance range and disallowing the tool from performing the prescribed operation on the unfinished workpiece when the flatness value does not lie within the flatness tolerance range.

13. The method set forth in claim 12 in which, when the flatness value lies within flatness tolerance range, the controller uses the flatness value to set at least one parameter for the prescribed operation which the tool is to perform on the unfinished workpiece.

14. The method set forth in claim 13 in which, when the flatness value lies within the flatness tolerance range, the controller uses the flatness value to set length of time for which the tool performs the prescribed operation on the unfinished workpiece.

15. The method set forth in claim 14 further comprising measuring thickness of a wall of the unfinished workpiece which contains the surface, and allowing the tool to perform the prescribed operation on the feature of the unfinished workpiece when the measured thickness lies within a thickness tolerance range and disallowing the tool from performing the prescribed operation on the feature of the unfinished workpiece when the measured thickness does not lie within the thickness tolerance range.

16. The method set forth in claim 1 further comprising measuring thickness of a wall of the unfinished workpiece which contains the surface, and allowing the tool to perform the prescribed operation on the feature of the unfinished workpiece when the measured thickness lies within a thickness tolerance range and disallowing the tool from performing the prescribed operation on the feature of the unfinished workpiece when the measured thickness does not lie within the thickness tolerance range.

17. The method set forth in claim 16 further comprising moving the one of the fixture and the processing unit to multiple locations at each of which thickness of the wall is measured and allowing the tool to perform the prescribed operation on the feature of the unfinished workpiece when the smallest thickness measured lies within the thickness tolerance range and disallowing the tool from performing the prescribed operation on the feature of the unfinished workpiece when the smallest thickness measured does not lie within the thickness tolerance range.

* * * * *